(12) United States Patent
Altunbasak et al.

(10) Patent No.: US 7,738,739 B2
(45) Date of Patent: Jun. 15, 2010

(54) METHOD AND APPARATUS FOR ADJUSTING THE RESOLUTION OF A DIGITAL IMAGE

(75) Inventors: Yucel Altunbasak, Norcross, GA (US); Toygar Akgun, Atlanta, GA (US); Tarik Arici, Marietta, GA (US)

(73) Assignee: Vestel Elektronik Sanayi Ve Ticaret A.S. (TR)

( * ) Notice: Subject to any disclaimer, the term of this patent is extended or adjusted under 35 U.S.C. 154(b) by 614 days.

(21) Appl. No.: 11/340,953

(22) Filed: Jan. 26, 2006

(65) Prior Publication Data

US 2007/0172152 A1 Jul. 26, 2007

(51) Int. Cl.
G06T 3/40 (2006.01)
(52) U.S. Cl. ...................................... 382/300
(58) Field of Classification Search .................. None
See application file for complete search history.

(56) References Cited

U.S. PATENT DOCUMENTS

| | | | |
|---|---|---|---|
| 6,323,905 B1 | 11/2001 | Kondo et al. | |
| 7,321,400 B1 * | 1/2008 | Chou et al. | 348/616 |
| 2003/0198399 A1 | 10/2003 | Atkins | |
| 2004/0013320 A1 * | 1/2004 | Atkins et al. | 382/300 |
| 2004/0015525 A1 * | 1/2004 | Martens et al. | 708/208 |

FOREIGN PATENT DOCUMENTS

WO 2004/112393 A1 12/2004

OTHER PUBLICATIONS

Zhao, M., et al.; "Intra-field de-interlacing with advanced up-scaling methods"; Consumer Electronics, 2004 IEEE International Symposium On Reading, UK Sep. 1-3, 2004, Piscataway, NJ, USA, IEEE, Sep. 1, 2004, pp. 315-319, XPO10755884 ISBN: 0-7803-8527-6.
Corduneanu, A., Platt, J.C.; "Learning Spatially-Variable Filters For Super-Resolution of Text" 2005 International Conference On Image processing, Sep. 11, 2005, XP002386971.
Atkins, C. Brian; Bouman, Charles A.; Allebach, Jan P.; "Optimal Image Scaling Using Pixel Classification"; IEEE; 2001; pp. 864-867.
Atkins, C. Brian; "Classification-Based Method in Optimal Image Interpolation"; A Thesis submitted to the Faculty of Purdue University; Director of Philosopy; Dec. 1998; pp. 1-106.

* cited by examiner

*Primary Examiner*—Jon Chang
(74) *Attorney, Agent, or Firm*—Conley Rose, P.C.

(57) ABSTRACT

A method and apparatus is disclosed for obtaining interpolation filters for use in a method or apparatus for enhancing the spatial resolution of a digital image. In the method or apparatus for enhancing the spatial resolution, input pixels from a low resolution image are classified and interpolated using the interpolation filters to form a high resolution image. The method for obtaining the interpolation filters includes obtaining a low resolution image from a high resolution source image. A plurality of pixels in the low resolution image are classified with respect to interpolation filters so that each of the plurality of pixels in the low resolution image is allocated to a respective interpolation filter. The interpolation filters are updated. The classifying and updating steps are repeated until a convergence criterion is met.

19 Claims, 4 Drawing Sheets

METHOD AND APPARATUS FOR ADJUSTING THE RESOLUTION OF A DIGITAL IMAGE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF THE INVENTION

The present invention relates to a method and apparatus for obtaining interpolation filters, and preferably also feature vectors, that can be used in a method and apparatus for enhancing the resolution of a digital image, and to a method and apparatus for enhancing the spatial resolution of a relatively low resolution digital image to provide a relatively higher resolution digital image using such interpolation filters and preferably also feature vectors.

The present invention relates generally to digital image scaling and resolution enhancement. The preferred embodiments allow digital images to be scaled with minimal blur and jagged edges. The techniques can be included in any system that needs to resize an input digital image or a sequence of digital images. A practical application is digital television sets where an input image needs to be displayed at a size different from (usually larger than) its original size without losing spatial detail and introducing jagged edges. Other applications include in printers where it is required to resize an input image to print it at a desired (usually greater) size, in digital cameras to allow a captured image to be viewed at a different (usually greater) resolution, and generally in digital image processing, such as of medical images, to increase the resolution of the image, etc., etc.

BACKGROUND OF THE INVENTION

Various image scaling techniques are known in the prior art. Many of these are of the so-called B-spline interpolator type. The simplest of the B-spline interpolators are of the zeroth and first orders. These are known respectively as pixel replication and bilinear interpolation. In pixel replication, each pixel in the high resolution output image is obtained by taking the value of the closest pixel in the low resolution input image. In bilinear interpolation, each pixel in the high resolution output image is obtained by computing a linear combination of up to four pixels in the low resolution input image. Higher order interpolations use more sophisticated techniques, but are computationally intensive.

A different, classification-based approach is disclosed in "Optimal Image Scaling Using Pixel Classification" by C. B. Atkins, C. A Bouman and J. P. Allebach, in Proceedings of the 2001 International Conference on Image Processing, 7-10 October 2001, volume 3, page(s): 864-867 and in more detail in the PhD thesis of C. B. Atkins entitled "Classification-based Methods in Optimal Image Interpolation". FIGS. 1 and 2 show schematically the technique disclosed by Atkins et al.

Referring first to FIG. 1, for every input pixel 1 in the low resolution input image 2, in this example a 5×5 window 3 of pixels in the low resolution input image 2 is centred on the input pixel 1. This 5×5 window is column-wise vectorised into a 25×1 column vector Z (referred to as an observation vector Z in the Atkins documents). Next, in a feature extractor block 11, a non-linear transformation projection operator f is applied to the observation vector Z to obtain a cluster vector or feature vector Y, i.e. Y=f(Z) for each input pixel 1. Generally speaking, Y is of lower dimension than Z. This mapping from the observation vector Z to the feature vector Y affects the quality of the final, interpolated high resolution image. A number of different projection operators f are possible.

The feature vector Y for each input pixel 1 is then passed to a classifier block 12 in which the feature vector Y for every input pixel 1 in the low resolution input image 2 is associated with (or "classified" or "clustered" to) a limited number of context classes. These context classes model different types of image regions in the input image 2, such as edges, smooth regions, textured regions, etc. For this purpose, distribution parameters θ are supplied to the classifier block 12, and the degree of association of the feature vector Y with the individual classes is determined inter alia in accordance with the distribution parameters θ. Atkins et al propose a statistical framework for attributing the input pixel 1 to the context classes. Thus, for every input pixel 1, the classifier block 12 computes and outputs a number between 0 and 1 for each of the context classes, these numbers being weight coefficients and summing to 1. The weight coefficients given to each class by the classifier block 12 are the likelihoods that the input pixel 1 belongs to the respective classes, i.e. wi is the probability that the input pixel 1 belongs to class i. The distribution parameters θ are obtained during a training process, which will be discussed further below.

Once the feature vector Y for each input pixel 1 has been associated with the context classes, a linear filter block 13 is used to obtain the output pixels 5 of the high resolution output image 6. In particular, for every input pixel 1 of the low resolution input image 2, a 5×5 window 3 of pixels centred on the input pixel 1 is passed to the linear filter block 13. The linear filter block 13 takes as an input the weight coefficients of the context classes calculated by the classifier block 12 for the particular input pixel 1 and takes as another input interpolation filter coefficients ψ which correspond to the respective context classes, and calculates an L×L block of output pixels 5 for the high resolution output image 6 by a linear combination of the outputs of the interpolation filters in proportions according to the weight coefficients calculated by the classifier block 12 for the particular input pixel 1. (L is the scaling factor. In the example shown in FIG. 1, L=2.) The interpolation process carried out by the linear filter block 13 can be summarised as:

$$x = \sum_{i=1}^{M} w_i(AZ + \beta)$$

where X is the L×L block of output pixels 5 in the interpolated high resolution output image 6, A is an interpolation matrix, β is a bias vector, $w_i$ are the weight coefficients for the respective context classes/filters, and M is the number of context classes/filters.

In short, in this prior art technique, the input pixels 1 are "classified" or associated with each of the context classes of the image to different degrees or "weights". The window X of interpolated output pixels 5 is obtained by first filtering the observation vector Z with the optimal interpolation filter coefficients ψ for the individual classes and then combining the results in a mixture of proportions as determined in the classification phase. The interpolation filter coefficients ψ input to the linear filter block 13 correspond to the interpolation matrix A and the bias vector β and are again obtained during a training process, which will be discussed further below.

Clearly, of key importance in this technique are the distribution parameters θ, which relate to the distribution of pixels amongst the context classes, and the interpolation filter coefficients ψ, which in essence determine the mixtures of the interpolating filters that are added together to obtain the output pixels 5 of the high resolution output image 6. In the Atkins documents, the distribution parameters θ and the interpolation filter coefficients ψ are obtained in an offline training method, which is carried out typically on a once-only basis. In particular, high resolution images are procured and then low resolution images are obtained from the high resolution images (by one or several different techniques). Referring to FIG. 2, a respective feature vector Y is obtained for each input pixel in the low resolution images. These are passed to a distribution parameter estimation block 14 in which an initial estimate of the distribution parameters θ is obtained. By making various assumptions, the values of the distribution parameters θ are updated to find a final, optimal value. Next, the interpolation filter coefficients ψ are obtained in an interpolation filter design block 15.

In this process, as noted in the Atkins documents, one of the principal assumptions that is made is that the feature vector Y provides all of the information about an input pixel in the low resolution (training) image and how it relates to the corresponding block of pixels in the high resolution source image. Owing to this assumption, the estimation of the interpolation filter coefficients ψ is effectively decoupled from the estimation of the distribution parameters θ. This actually causes the computed interpolation filter to be sub-optimal, which in turn implies a loss of possible quality of the interpolated high resolution image.

SUMMARY OF THE INVENTION

According to a first aspect of the present invention, there is provided a method of obtaining interpolation filters for use in a method or apparatus for enhancing the spatial resolution of a digital image in which input pixels from a low resolution image are classified and interpolated using said interpolation filters to form a high resolution image, the method comprising: obtaining a low resolution image from a high resolution source image; classifying a plurality of pixels in the low resolution image with respect to interpolation filters so that each of the plurality of pixels in the low resolution image is allocated to a respective interpolation filter; updating the interpolation filters; and, repeating the classifying and updating steps until a convergence criterion is met.

By updating the interpolation filters in this manner, the interpolation filters are optimised better than in the prior art, which leads to a better quality image in the interpolated output high resolution image obtained in an interpolation process that makes use of the interpolation filters. Alternatively or additionally, fewer interpolation filters can be used in the interpolation process without sacrificing image quality, which makes the interpolation process quicker and cheaper to implement.

In a preferred embodiment, the classifying with respect to interpolation filters step comprises: computing, for each of said plurality of pixels in the low resolution image, interpolated high resolution pixels using interpolation filters, comparing the interpolated high resolution pixels with pixels in the high resolution source image, and labelling each of said plurality of pixels in the low resolution image with the interpolation filter that provides a minimum difference between the interpolated high resolution pixels and the pixels in the high resolution source image.

In a preferred embodiment, the updating the interpolation filters step comprises: for each interpolation filter, updating the interpolation filter with the values of the interpolation filter that provides, for the pixels that have been allocated to said interpolation filter, a minimum difference between the interpolated high resolution pixels and the pixels in the high resolution source image.

Preferably the method further obtains feature vectors for use in a method or apparatus for enhancing the spatial resolution of a digital image in which input pixels from a low resolution image are classified and interpolated using said feature vectors and interpolation filters to form a high resolution image, and the method comprises, after the classifying-with-respect-to-interpolation-filters step and before the updating-the-interpolation-filters step: updating feature vectors for each of the pixels that have been allocated to an interpolation filter; and, classifying the plurality of pixels in the low resolution image with respect to the feature vectors.

Again, updating the feature vectors in this manner means that the feature vectors are optimised better than in the prior art, which leads to a better quality image in the interpolated output high resolution image obtained in an interpolation process that makes use of the feature vectors. Alternatively or additionally, fewer interpolation filters can be used in the interpolation process without sacrificing image quality, which makes the interpolation process quicker and cheaper to implement.

In a preferred embodiment, the updating feature vectors step comprises: taking, as the updated feature vector for all of the pixels that have been allocated to an interpolation filter, the average of the feature vectors for all of the pixels that have been allocated to the interpolation filter.

In a preferred embodiment, the updating feature vectors step comprises: taking, as the updated feature vector for all of the pixels that have been allocated to an interpolation filter, the feature vector among the feature vectors of said pixels that provides a minimum difference between the interpolated high resolution pixels and the pixels in the high resolution source image.

In a preferred embodiment, the classifying with respect to the feature vectors step comprises: for each of said plurality of pixels in the low resolution image, labelling each of said plurality of pixels in the low resolution image with the index of the interpolation filter having the feature vector that is closest to the feature vector of the pixel in the low resolution image.

In a preferred embodiment, the low resolution image is obtained from the high resolution source image and then compressed using discrete cosine transformation. This enables the interpolation filters, and optionally the feature vectors, to be optimised for particular use in enhancing the resolution of images that have been compressed using discrete cosine transformation, which includes JPEG and MPEG images.

In a preferred embodiment, the low resolution image obtained from the high resolution source image is transformed by wavelet transformation. This enables the interpolation filters, and optionally the feature vectors, to be optimised for particular use in enhancing the resolution of images that have been transformed using wavelet transformation, which includes JPEG 2000 images.

In a preferred embodiment, the low resolution image contains text. This enables the interpolation filters, and optionally the feature vectors, to be optimised for particular use in enhancing the resolution of images that contain text, including for example Teletext and subtitles.

In an embodiment, a method of enhancing the spatial resolution of a relatively low resolution digital image to provide a relatively higher resolution digital image comprises: obtaining a feature vector for each of a plurality of pixels in a relatively low resolution digital image; classifying the feature vector of each of said plurality of pixels in the relatively low resolution digital image so that each of said plurality of pixels in the relatively low resolution digital image is allocated to one or more interpolation filters; and, interpolating said plurality of pixels in the relatively low resolution digital image in accordance with the allocated one or more interpolation filters; wherein the interpolation filters are obtained in accordance with a method as described above.

In a preferred embodiment, the feature vectors are obtained in accordance with a method as described above.

According to a second aspect of the present invention, there is provided apparatus for obtaining interpolation filters for use in a method or apparatus for enhancing the spatial resolution of a digital image in which input pixels from a low resolution image are classified and interpolated using said interpolation filters to form a high resolution image, the apparatus comprising: a classifier constructed and arranged to classify a plurality of pixels in a low resolution image with respect to interpolation filters so that each of the plurality of pixels in the low resolution image is allocated to a respective interpolation filter, said low resolution image having been obtained from a high resolution source image; and, an interpolation filter updater constructed and arranged to update the interpolation filters; the apparatus being constructed and arranged to repeat the classifying and updating until a convergence criterion is met.

In a preferred embodiment, the classifier that classifies with respect to interpolation filters is constructed and arranged to compute, for each of said plurality of pixels in the low resolution image, interpolated high resolution pixels using interpolation filters, to compare the interpolated high resolution pixels with pixels in the high resolution source image, and to label each of said plurality of pixels in the low resolution image with the interpolation filter that provides a minimum difference between the interpolated high resolution pixels and the pixels in the high resolution source image.

In a preferred embodiment, the updater that updates the interpolation filters step is constructed and arranged to, for each interpolation filter, update the interpolation filter with the values of the interpolation filter that provides, for the pixels that have been allocated to said interpolation filter, a minimum difference between the interpolated high resolution pixels and the pixels in the high resolution source image.

In a preferred embodiment, the apparatus further obtains feature vectors for use in a method or apparatus for enhancing the spatial resolution of a digital image in which input pixels from a low resolution image are classified and interpolated using said feature vectors and interpolation filters to form a high resolution image, the apparatus comprising: a feature vector updater constructed and arranged to update feature vectors for each of the pixels that have been allocated to an interpolation filter; and, a classifier constructed and arranged to classify the plurality of pixels in the low resolution image with respect to the feature vectors.

In a preferred embodiment, the feature vector updater is constructed and arranged to take, as the updated feature vector for all of the pixels that have been allocated to an interpolation filter, the average of the feature vectors for all of the pixels that have been allocated to the interpolation filter.

In a preferred embodiment, the feature vector updater is constructed and arranged to take, as the updated feature vector for all of the pixels that have been allocated to an interpolation filter, the feature vector among the feature vectors of said pixels that provides a minimum difference between the interpolated high resolution pixels and the pixels in the high resolution source image.

In a preferred embodiment, the classifier that classifies with respect to the feature vectors is constructed and arranged, for each of said plurality of pixels in the low resolution image, to label each of said plurality of pixels in the low resolution image with the index of the interpolation filter having the feature vector that is closest to the feature vector of the pixel in the low resolution image.

In an embodiment, apparatus for enhancing the spatial resolution of a relatively low resolution digital image to provide a relatively higher resolution digital image comprises: a feature vector classifier constructed and arranged to classify a feature vector of each of a plurality of pixels in a relatively low resolution digital image so that each of said plurality of pixels in the relatively low resolution digital image is allocated to one or more interpolation filters; and, an interpolator constructed and arranged to interpolate said plurality of pixels in the relatively low resolution digital image in accordance with the allocated one or more interpolation filters; wherein the interpolation filters are obtained in accordance with a method as described above.

In a preferred embodiment, the feature vectors are obtained in accordance with a method as described above.

The preferred interpolation apparatus and/or method may be incorporated into any apparatus and/or method that is used to enhance the resolution of a digital image, including for example upscalers, whether stand-alone or incorporated into an image processor used in a television set or the like, printers, digital image processing software, etc., etc. The methods described herein may be carried out by appropriate software running on appropriate computer equipment. The software may be embedded in an integrated circuit, the integrated circuit being adapted for performing, or for use in the performance of, the relevant processes. Many of the processing steps may be carried out using software, dedicated hardware (such as ASICs), or a combination.

BRIEF DESCRIPTION OF THE DRAWINGS

Embodiments of the present invention will now be described by way of example with reference to the accompanying drawings, in which.

DETAILED DESCRIPTION OF THE INVENTION

Figure 1:
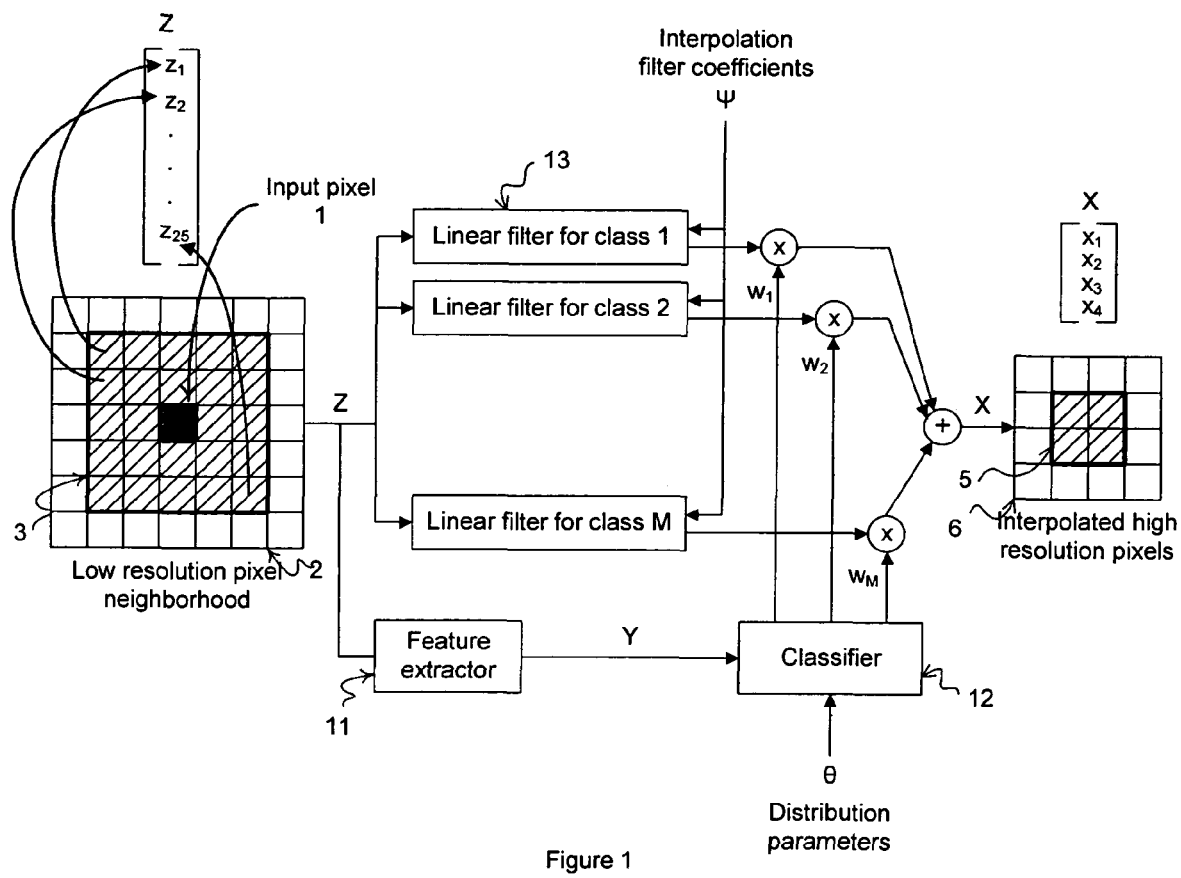
FIG. 1 shows schematically a prior art technique for optical image scaling using pixel classification.
Figure 2:
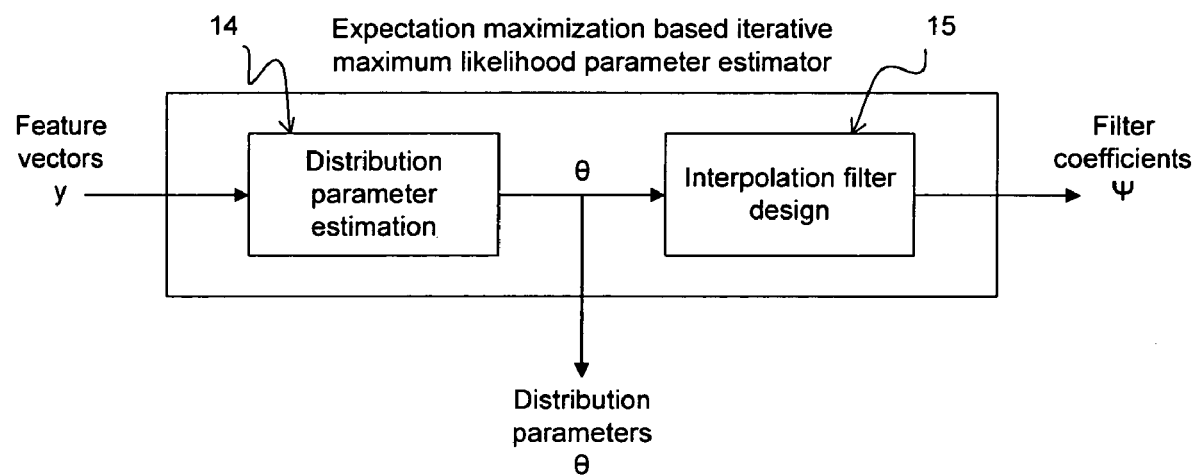
FIG. 2 shows schematically how distribution parameters and interpolation filter coefficients for the method of FIG. 1 are obtained in the prior art.
Figure 3:
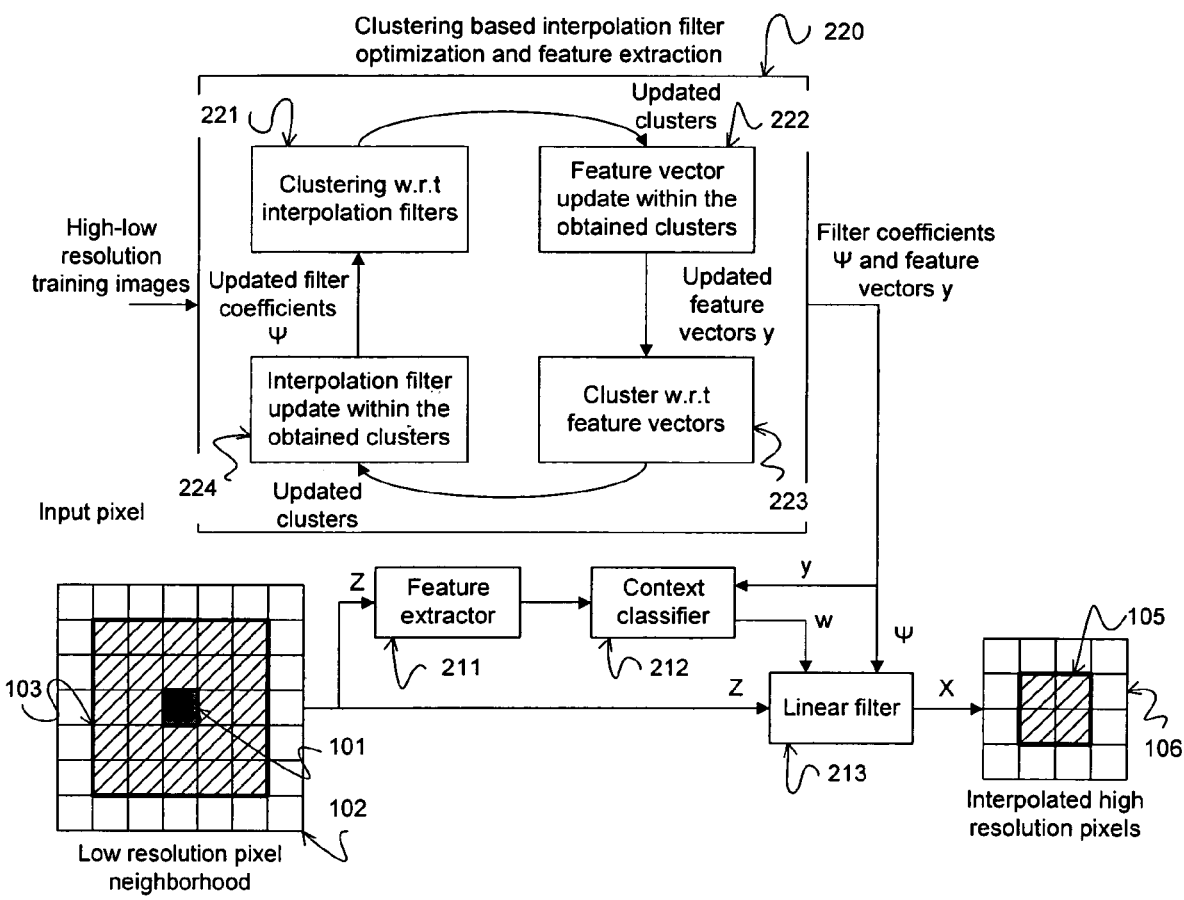
FIG. 3 shows schematically an example of apparatus in accordance with an embodiment of the present invention; and, FIG. 4 shows schematically an example of a method in accordance with an embodiment of the present invention.

Referring to FIG. 3, an example of an interpolation process in accordance with a preferred embodiment of the present invention is basically similar to the interpolation process of the prior art technique disclosed by Atkins et al and shown schematically in FIG. 1. In particular, for every input pixel 101 in a low resolution input image 102, a 5×5 window 103 is column-wise vectorised into a 25×1 column vector Z, which may be termed an observation vector Z. In a feature extractor block 211, the observation vector Z is mapped to a feature vector Y, which is usually of lower dimensionality, by using a non-linear transformation projection operator f, i.e. Y=f(Z) for each input pixel 101. Generally speaking, Y is of lower dimension than Z. This mapping from the observation vector Z to the feature vector Y affects the quality of the final, interpolated high resolution image. A number of different projection operators f are possible.

By way of explanation, the feature vector Y of each input pixel 101 from the low resolution input image 102 is used so that the input pixel 101 can be classified to be a member of a limited number of context classes. This classification takes place in the context classifier block 212. As in the prior art, these context classes model different image regions, like edges, smooth regions, textured regions, etc. in the image. There is a different set of interpolation filter coefficients ψ for every context class, the coefficients being fine-tuned according to the special characteristics of that context class. In a preferred embodiment, for every input pixel 101, the context classifier block 212 outputs the index of the best context class, i.e. the context class with the feature vector that is closest to the feature vector of the input pixel 101 (e.g. the context class whose feature vector gives the minimum squared error when compared to the feature vector of the input pixel 101), and the respective differences between all of the context classes and the feature vector of the input pixel 101 (e.g. the squared errors between the feature vectors of all of the context classes and the feature vector of the input pixel 101). The weights of the different context classes are inversely proportional to the squared distances between the feature vectors of the context classes and the feature vector of the input pixel 101. Thus, the context class whose feature vector has the largest error is assigned the smallest weight. Thus, if the distances between the feature vectors of the M classes and the feature vector of the current low resolution pixel 101 is:

$$d_i = \|Y - Y_i\|_2^2 \text{ for } i = 1, 2, \ldots, M$$

where Y is the feature vector of the current low resolution pixel and $Y_i$ are the feature vectors of the M context classes, then the weight for class i is:

$$w_i = \frac{\frac{1}{d_i}}{\sum_{j=1}^{M} \frac{1}{d_j}}.$$

Next, the actual interpolation takes place. A 5×5 window is again centred on each input pixel 101 in the low resolution input image 102 and this is passed to a linear filter block 213. The linear filter block 213 receives the interpolation filter coefficients ψ and the weights output by the context classifier block 212. Similarly to the techniques disclosed by Atkins et al, the linear filter block 213 adds the interpolation filter coefficients ψ in proportions according to the weight calculated by the context classifier block 212 for the particular input pixel 101. The output of the linear filter block 213 is the L×L window of output pixels 105 of the high resolution output image 106 (where L is the scaling factor, here two). The interpolation from the observation vector Z to the output vector X can be stated as:

$$x = \sum_{i=1}^{M} w_i (AZ + \beta).$$

This particular interpolation process is a deterministic process, which can be contrasted with the statistical approach proposed by Atkins et al. It should be understood that this particular interpolation process is only one way of adding the various interpolation filter coefficients ψ in a deterministic manner. In this example, the context classifier block 212 calculates weights for all of the M context classes. In the preferred embodiment, M can be relatively small, certainly smaller than in the Atkins et al proposal, and therefore this computation can be done in a reasonable time period. However, if necessary or desirable, fewer than the maximum M context classes may be used and, for example, only those context classes with small errors, below some threshold, or only the m (<M) context classes with the smallest errors, may be used.

A key difference in the present preferred method and apparatus is that the feature vectors Y and the interpolation filter coefficients ψ, which correspond to the M context classes, input to the context classifier block 212 and linear filter block 213 are obtained in a different manner (and therefore are in themselves different from their corresponding values in the prior art).

Still referring to FIG. 3, block 220 shows schematically an example of a preferred method of obtaining interpolation filters and feature vectors in accordance with an embodiment of the present invention. This obtaining of the optimised interpolation filter coefficients ψ and feature vectors Y is preferably carried out off-line in a training program using training images. Typically this may be carried out on a once-only basis.

In particular, a number of high resolution source images are procured and corresponding low resolution images are obtained from the high resolution images, by appropriate downsampling and/or downscaling, etc., to obtain training images.

In block 221, all of the input pixels of the low resolution input training image are first clustered (or "classified") with respect to the interpolation filters. This is accomplished in the preferred embodiment by going through all of the low-resolution training pixels in turn, computing interpolated high-resolution pixels by using all interpolation filters one by one, and then (mathematically) comparing the interpolated pixels to the corresponding pixels in the original high resolution image from which the training low resolution image was obtained. In the preferred embodiment, each low resolution pixel is then labelled with the index of the (single) interpolation filter that gives the minimum mean-squared-error between the pixels of the interpolated high resolution image and the corresponding pixels of the actual high resolution image.

Once all of the input pixels from the low resolution input image have been classified, the feature vectors Y of the various clusters of pixels are updated one by one with the current elements of the cluster in feature vector update block 222. This update can be done in various different ways, depending for example on the nature of the feature vectors. Given a particular feature vector structure, an update strategy can be determined. For example, one example feature vector Y is the first order difference in the window of low resolution pixels. In such a case, the feature vectors Y can be updated using the average of the feature vectors Y of the low resolution pixels in a class. In another example, the feature vector Y that is selected is the feature vector Y of the input pixel of the low resolution training image that provides the lowest squared-error between the corresponding pixels of the actual high resolution image and the corresponding pixels obtained by interpolating using the optimal interpolation filter determined previously.

After the feature vectors Y have been updated in block 222, the updated feature vectors Y are passed to block 223 which clusters the low resolution pixels with respect to the feature vectors Y (i.e. with respect to their context). In one embodiment, this is done by going through all of the input pixels from the low resolution training image, computing the distance between the pixel's feature vector (which is representative of the local image characteristics of the low resolution pixel) and the cluster feature vectors (which are representative of different image characteristics, like edges, smooth regions, textured regions, etc.). Then the input pixel from the low resolution training image is labelled with the index of the cluster whose feature vector is the closest to the feature vector of the input pixel.

Once the input pixels of the low resolution training image have been clustered with respect to their feature vectors (i.e. their context has effectively been classified), the interpolation filter coefficients $\psi$ for all clusters are updated with values from the filter that minimises the mean-squared-error between the interpolated high resolution pixels and the actual high resolution pixels, this being computed for all low resolution pixels in each cluster. This takes place in interpolation filter update block 224. The updated filter coefficients can then be passed from the interpolation filter coefficients update block 224 to the block 221 that clusters the low-resolution training pixels with respect to the interpolation filters.

This process can be repeated until some convergence criterion is met, as will be discussed briefly below.

Figure 4:
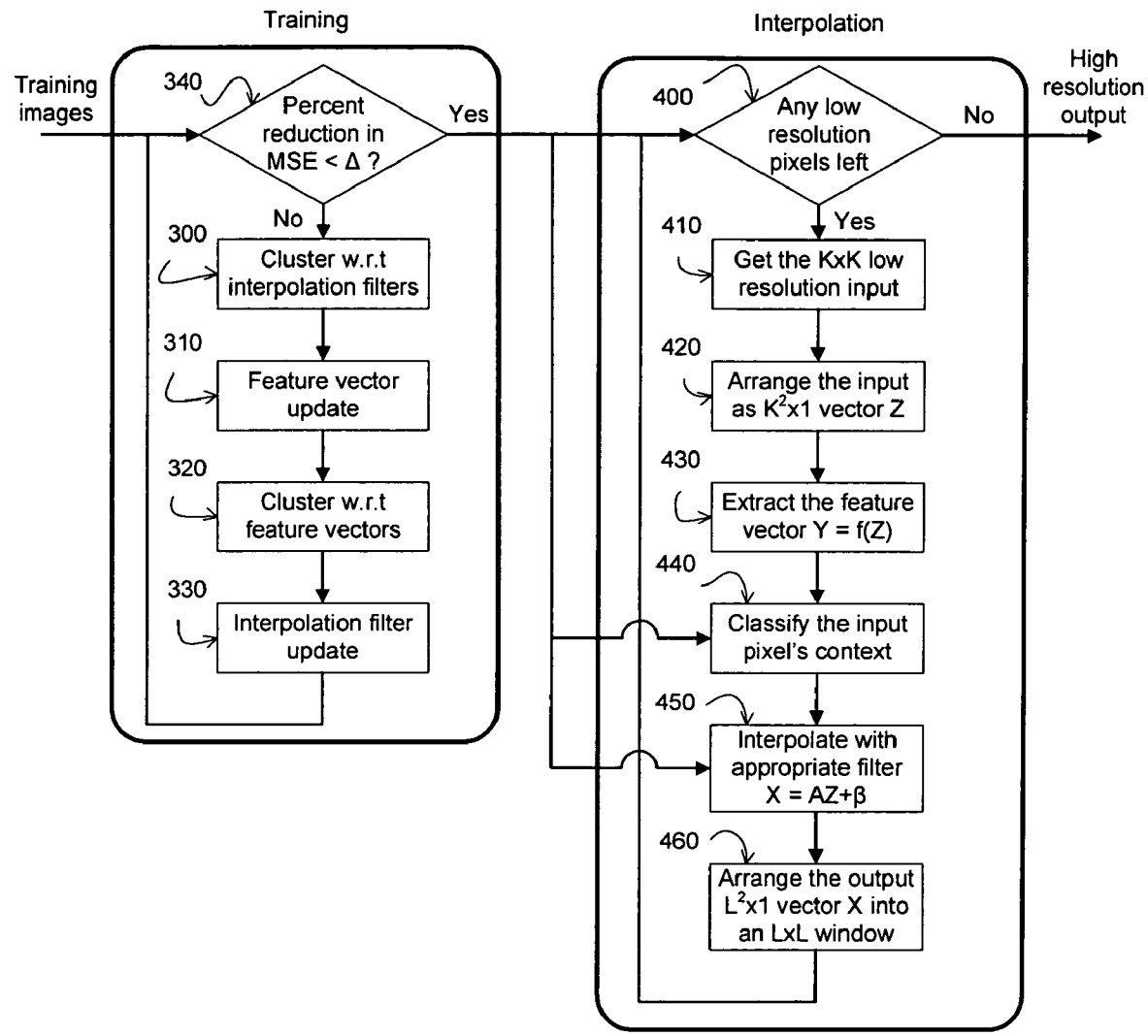

In short, therefore, and referring to the schematic flow diagram of FIG. 4, in the preferred training method, low resolution training images are obtained from high resolution source images. In step 300, pixels in the low resolution training images are clustered with respect to respective interpolation filters (block 221 of FIG. 3). In step 310, the feature vectors of the various clusters of pixels are updated one by one with the current elements of the cluster (block 222 of FIG. 3). In step 320, the low resolution pixels are clustered with respect to the feature vectors (block 223 of FIG. 3). In step 330, the interpolation filter coefficients for all clusters are updated (block 224 of FIG. 3). In the preferred method, these steps are repeated so as to update iteratively the feature vectors Y and the interpolation filter coefficients $\psi$ until sufficient convergence is obtained. For example, after the interpolation filter update step 330, a decision is made in step 340 as to whether there has been sufficient decrease in the total mean-squared-error computed over all pairs of corresponding windows in the original high resolution source image and the high resolution image obtained by interpolating the low resolution training image. If for example the percentage decrease is less than some threshold (say 0.01 or 0.001), which indicates that there has been marginal improvement since the previous iteration, then the iteration stops. The values of the feature vectors Y and the interpolation filter coefficients $\psi$ thereby obtained are then used in the actual interpolation process.

In the actual interpolation process, similarly to the process disclosed in the Atkins documents mentioned above, first a check is made at step 400 whether there are any low resolution pixels left in the low resolution image. (In the preferred embodiment, the interpolation filters are applied to all low resolution pixels in raster scan order.) If yes, then, in step 410, a window of K×K pixels centred on an input pixel from the low resolution input image is obtained. (In the examples described above, K=5). In step 420, the K×K pixels are rearranged into a $K^2 \times 1$ column vector Z. In step 430, for every input low resolution pixel, a feature vector Y is obtained from the column vector Z. In this embodiment, the feature vectors Y are selected from the feature vectors obtained in the off-line training method discussed above with reference to FIG. 3 and the steps 300 to 340 of FIG. 4.

In step 440, the feature vector of every low resolution input pixel is used to classify the input low resolution pixel as a member of a limited number of context classes, weighting the classes as discussed above. Again, these classes model different image regions, like edges, smooth regions, textured regions, etc. There is a different set of interpolation filter coefficients for every context, these being fine tuned to the special characteristics of that context, and being obtained in the off-line training method discussed above.

Then, in step 450, linear interpolation takes place as discussed above. In this example, a 5×5 window is centred at the input low resolution pixel to obtain a L×L block of high resolution pixels. (L is the scaling factor and equals two in the examples discussed above.) In step 460, the output from the interpolation step 450 is reshaped from the $L^2 \times 1$ vector to the L×L window of pixels in the high resolution interpolated output image. Flow then returns to the condition check step 400. Ultimately, when no low resolution pixels are left, the high resolution output image is obtained.

The preferred embodiment therefore provides an advanced training scheme for obtaining better interpolation filters and feature vectors. This in turn leads to a better quality image in the interpolated high resolution image obtained from the low resolution input image. Moreover, it has been found that high resolution images can be obtained from low resolution images in which the interpolated high resolution images have a comparable or better quality than those obtained in the prior art whilst using a smaller number of filters (for example up to 8 to 10 filters) compared to the prior art (which usually requires at least 20 to 30 filters in order to obtain an acceptable quality). Thus, using the more advanced training technique, which in general is more computationally intensive than the corresponding training technique of the prior art, the computational complexity of the actual interpolation process can be much reduced without sacrificing image quality, which thus makes the interpolation process cheaper and quicker to implement.

Whilst in the preferred embodiment both the interpolation filters and the feature vectors are updated and optimised iteratively during the training program, optionally only the interpolation filters may be optimised during the iterative training method. In other words, optionally blocks 222 and 223 and steps 310 and 320 described above may be omitted. This option inevitably may sacrifice image quality slightly, but requires less computation during the training program.

In the preferred training method discussed above, to be able to start the training iterations, a set of initial values for the interpolation filter coefficients is required. There are many different strategies for initialising the interpolation filter coefficients. It is a well-known fact that for iterative algorithms, such as the preferred training method, the initial conditions affect the convergence rate and the final results. Thus, it is important to choose the initial filter coefficients wisely. In a preferred embodiment, a single non-directional Gaussian shaped filter and several directional Gaussian filters are used to initialise the filter coefficients. The Gaussian filters are obtained from the standard two-dimensional Gaussian kernel:

$$f(x, y) = \frac{1}{2\pi\sigma_X\sigma_Y\sqrt{1-\rho^2}}$$
$$\exp\left[-\frac{1}{2(1-\rho^2)}\left(\frac{(x-m_X)^2}{\sigma_X^2} - \frac{2\rho(x-m_X)(y-m_Y)}{\sigma_X\sigma_Y} - \frac{(y-m_Y)^2}{\sigma_Y^2}\right)\right]$$

and can be warped to have the desired edge orientation by adjusting the correlation coefficient $\rho$ and the standard deviations $\sigma_X$, $\sigma_Y$. Other methods for choosing the initial filter coefficients are possible.

The training program may be adapted according to the nature of the low resolution images that are to be interpolated in the actual interpolation process.

For example, in the training program, the procured high resolution images can be downsampled and then compressed using discrete cosine transformation (DCT), which is used for example in the JPEG and MPEG compression techniques. In this way, the feature vectors and interpolation filters that are obtained in the training program will be optimised for use in interpolating images that have been compressed using DCT.

In another example, the training program may use specific types of image data in order to improve the interpolation of low resolution images that have or consist of that specific type of image data. The training program is performed using selected high resolution images that are known to belong to the desired type of images in order to obtain interpolation filters and feature vectors that are optimised for this specific type of image. A particular example may be for improving the resolution of Teletext or other overlaid text, such as subtitles, on television pictures. In this case, the higher resolution images used in the training program are chosen to include or to consist of text-like images, including letters and numbers of different sizes.

In yet another example, during the interpolation process, the low resolution images are first transformed with an appropriate transformation and filtering is performed in the transformed domain. The high resolution interpolated image is obtained by applying the inverse transformation. For example, during the interpolation process, the low resolution image data may be transformed using wavelet decomposition. In such a case, as is known, most of the spatial details of the image are concentrated in high-high (HH), low-high (LH) and high-low (HL) components. The low-low (LL) component is dominated by the DC level of the image but does contain spatial details. In such a case, the training program is preferably performed on low resolution training images that are correspondingly transformed. In a most preferred embodiment, the training is performed on the HH, LH and HL components separately and these components are interpolated separately during the interpolation process. The LL component can be interpolated with a simpler method, such as bilinear interpolation. In any event, during this preferred training program, the feature vectors for the different wavelet components are inevitably tailored to the characteristics of these components. For example, the HL component includes mostly the vertical spatial details and the corresponding feature vectors can be made more discriminative by exploiting this structure.

Embodiments of the present invention have been described with particular reference to the examples illustrated. However, it will be appreciated that variations and modifications may be made to the examples described within the scope of the present invention.

What is claimed is:

1. A method of obtaining interpolation filters and feature vectors for use in a method or apparatus for enhancing the spatial resolution of a digital image in which input pixels from a low resolution image are classified and interpolated using said feature vectors and said interpolation filters to form a high resolution image, the method comprising:
   obtaining a low resolution image from a high resolution source image;
   classifying, by a processor, a plurality of pixels in the low resolution image into respective context classes using interpolation filters so that each of the plurality of pixels in the low resolution image is allocated to a respective interpolation filter;
   updating, by the processor, feature vectors for each of the pixels that have been allocated to an interpolation filter;
   classifying, by the processor, the plurality of pixels in the low resolution image into respective context classes using the feature vectors;
   updating, by the processor, the interpolation filters; and,
   repeating the classifying with respect to interpolation filters and feature vectors and updating of feature vectors and interpolation filters until a convergence criterion is met.

2. A method according to claim 1, wherein the classifying using interpolation filters comprises:
   computing, for each of said plurality of pixels in the low resolution image, interpolated high resolution pixels using interpolation filters, comparing the interpolated high resolution pixels with pixels in the high resolution source image, and labelling each of said plurality of pixels in the low resolution image with the interpolation filter that provides a minimum difference between the interpolated high resolution pixels and the pixels in the high resolution source image.

3. A method according to claim 1, wherein the updating the interpolation filters comprises:
   for each interpolation filter, updating the interpolation filter with the values of the interpolation filter that provides, for the pixels that have been allocated to said interpolation filter, a minimum difference between the interpolated high resolution pixels and the pixels in the high resolution source image.

4. A method according to claim 1, wherein the updating feature vectors comprises:
   taking, as the updated feature vector for all of the pixels that have been allocated to an interpolation filter, the average of the feature vectors for all of the pixels that have been allocated to the interpolation filter.

5. A method according to claim 1, wherein the updating feature vectors comprises:
   taking, as the updated feature vector for all of the pixels that have been allocated to an interpolation filter, the feature vector among the feature vectors of said pixels that provides a minimum difference between the interpolated high resolution pixels and the pixels in the high resolution source image.

6. A method according to claim 1, wherein the classifying using the feature vectors comprises:
   for each of said plurality of pixels in the low resolution image, labelling each of said plurality of pixels in the low resolution image with the index of the interpolation filter having the feature vector that is closest to the feature vector of the pixel in the low resolution image.

7. A method according to claim 1, wherein the low resolution image is obtained from the high resolution source image and then compressed using discrete cosine transformation.

8. A method according to claim 1, wherein the low resolution image obtained from the high resolution source image is transformed by wavelet transformation.

9. A method according to claim 1, wherein the low resolution image contains text.

10. A method of enhancing the spatial resolution of a relatively low resolution digital image to provide a relatively higher resolution digital image, the method comprising:
    obtaining a feature vector for each of a plurality of pixels in a relatively low resolution digital image;
    classifying, by a processor, the feature vector of each of said plurality of pixels in the relatively low resolution digital image so that each of said plurality of pixels in the relatively low resolution digital image is allocated to one or more interpolation filters; and,
    interpolating, by the processor, said plurality of pixels in the relatively low resolution digital image in accordance with the allocated one or more interpolation filters;
    wherein the interpolation filters are obtained in accordance with a method according to claim 1.

11. A method according to claim 10, wherein the feature vectors are obtained by, after the classifying-using-interpolation-filters and before the updating-the-interpolation-filters:
    updating the feature vectors for each of the pixels that have been allocated to an interpolation filter; and,
    classifying the plurality of pixels in the low resolution image into respective context classes using the feature vectors.

12. Apparatus comprising one or more integrated circuits operable to obtain feature vectors and interpolation filters for use in a method or apparatus for enhancing the spatial resolution of a digital image in which input pixels from a low resolution image are classified and interpolated using said feature vectors and said interpolation filters to form a high resolution image, the apparatus comprising:
    a classifier constructed and arranged to classify a plurality of pixels in a low resolution image into respective context classes using interpolation filters so that each of the plurality of pixels in the low resolution image is allocated to a respective interpolation filter, said low resolution image having been obtained from a high resolution source image;
    a feature vector updater constructed and arranged to update feature vectors for each of the pixels that have been allocated to an interpolation filter; and,
    a classifier constructed and arranged to classify the plurality of pixels in the low resolution image into respective context classes using the feature vectors,
    an interpolation filter updater constructed and arranged to update the interpolation filters;
    the apparatus being constructed and arranged to repeat the classifying with respect to interpolation filters and feature vectors and updating of feature vectors and interpolation filters until a convergence criterion is met.

13. Apparatus according to claim 12, wherein the classifier that classifies using interpolation filters is constructed and arranged to compute, for each of said plurality of pixels in the low resolution image, interpolated high resolution pixels using interpolation filters, to compare the interpolated high resolution pixels with pixels in the high resolution source image, and to label each of said plurality of pixels in the low resolution image with the interpolation filter that provides a minimum difference between the interpolated high resolution pixels and the pixels in the high resolution source image.

14. Apparatus according to claim 12, wherein the updater that updates the interpolation filters is constructed and arranged to, for each interpolation filter, update the interpolation filter with the values of the interpolation filter that provides, for the pixels that have been allocated to said interpolation filter, a minimum difference between the interpolated high resolution pixels and the pixels in the high resolution source image.

15. Apparatus according to claim 12, wherein the feature vector updater is constructed and arranged to take, as the updated feature vector for all of the pixels that have been allocated to an interpolation filter, the average of the feature vectors for all of the pixels that have been allocated to the interpolation filter.

16. Apparatus according to claim 12, wherein the feature vector updater is constructed and arranged to take, as the updated feature vector for all of the pixels that have been allocated to an interpolation filter, the feature vector among the feature vectors of said pixels that provides a minimum difference between the interpolated high resolution pixels and the pixels in the high resolution source image.

17. Apparatus according to claim 12, wherein the classifier that classifies using the feature vectors is constructed and arranged, for each of said plurality of pixels in the low resolution image, to label each of said plurality of pixels in the low resolution image with the index of the interpolation filter having the feature vector that is closest to the feature vector of the pixel in the low resolution image.

18. Apparatus comprising one or more integrated circuits operable to enhance the spatial resolution of a relatively low resolution digital image to provide a relatively higher resolution digital image, the apparatus comprising:
    a feature vector classifier constructed and arranged to classify a feature vector of each of a plurality of pixels in a relatively low resolution digital image so that each of said plurality of pixels in the relatively low resolution digital image is allocated to one or more interpolation filters; and,
    an interpolator constructed and arranged to interpolate said plurality of pixels in the relatively low resolution digital image in accordance with the allocated one or more interpolation filters;
    wherein the interpolation filters are obtained in accordance with a method according to claim 1.

19. Apparatus according to claim 18, wherein the feature vectors are obtained by, after the classifying-using-interpolation-filters and before the updating-the-interpolation-filters:
    updating the feature vectors for each of the pixels that have been allocated to an interpolation filter; and,
    classifying the plurality of pixels in the low resolution image into respective context classes using the feature vectors.

* * * * *